L. A. YOUNG.
HOOD FOR AUTOMOBILES.
APPLICATION FILED APR. 8, 1920.
1,411,985.
Patented Apr. 4, 1922.
2 SHEETS—SHEET 1.
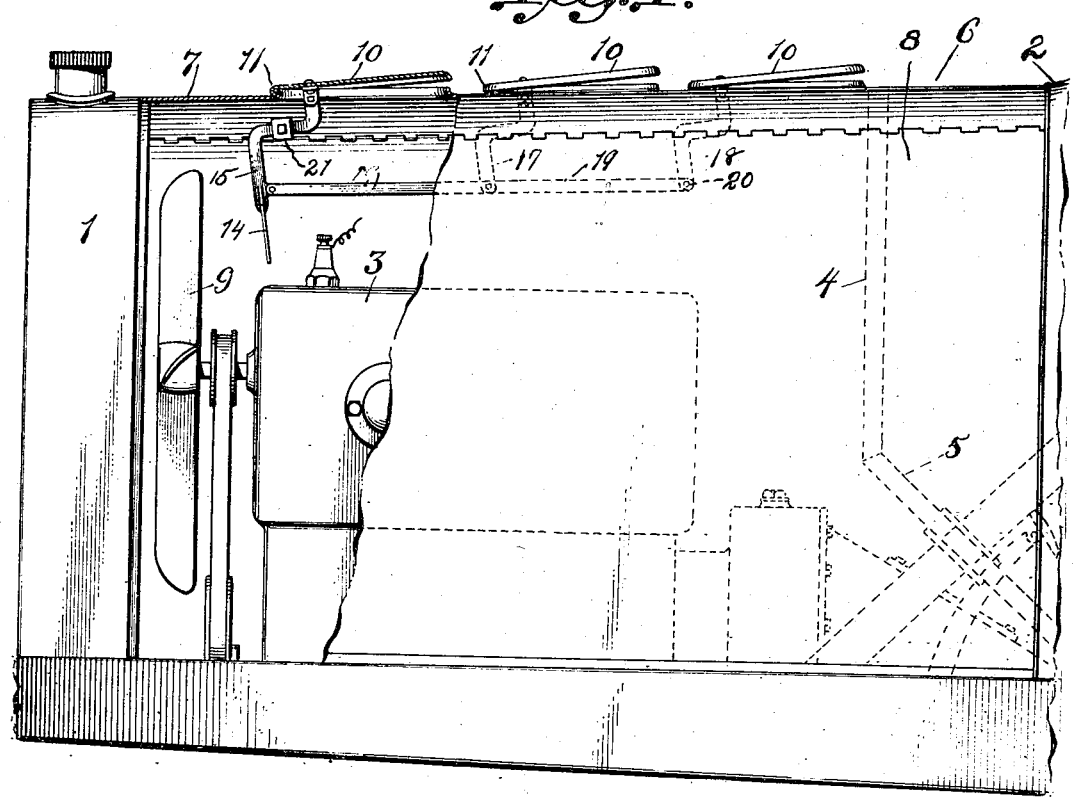
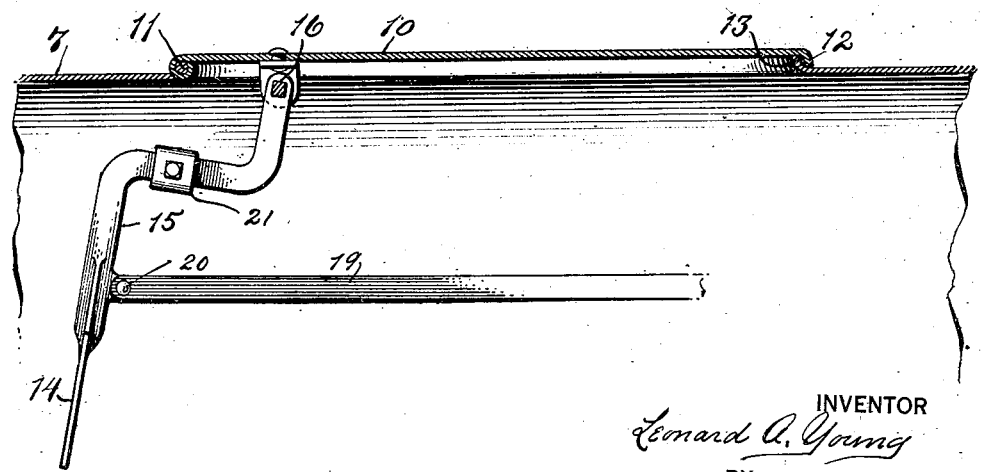
INVENTOR
Leonard A. Young
BY
Clement P. Stickney
ATTORNEY

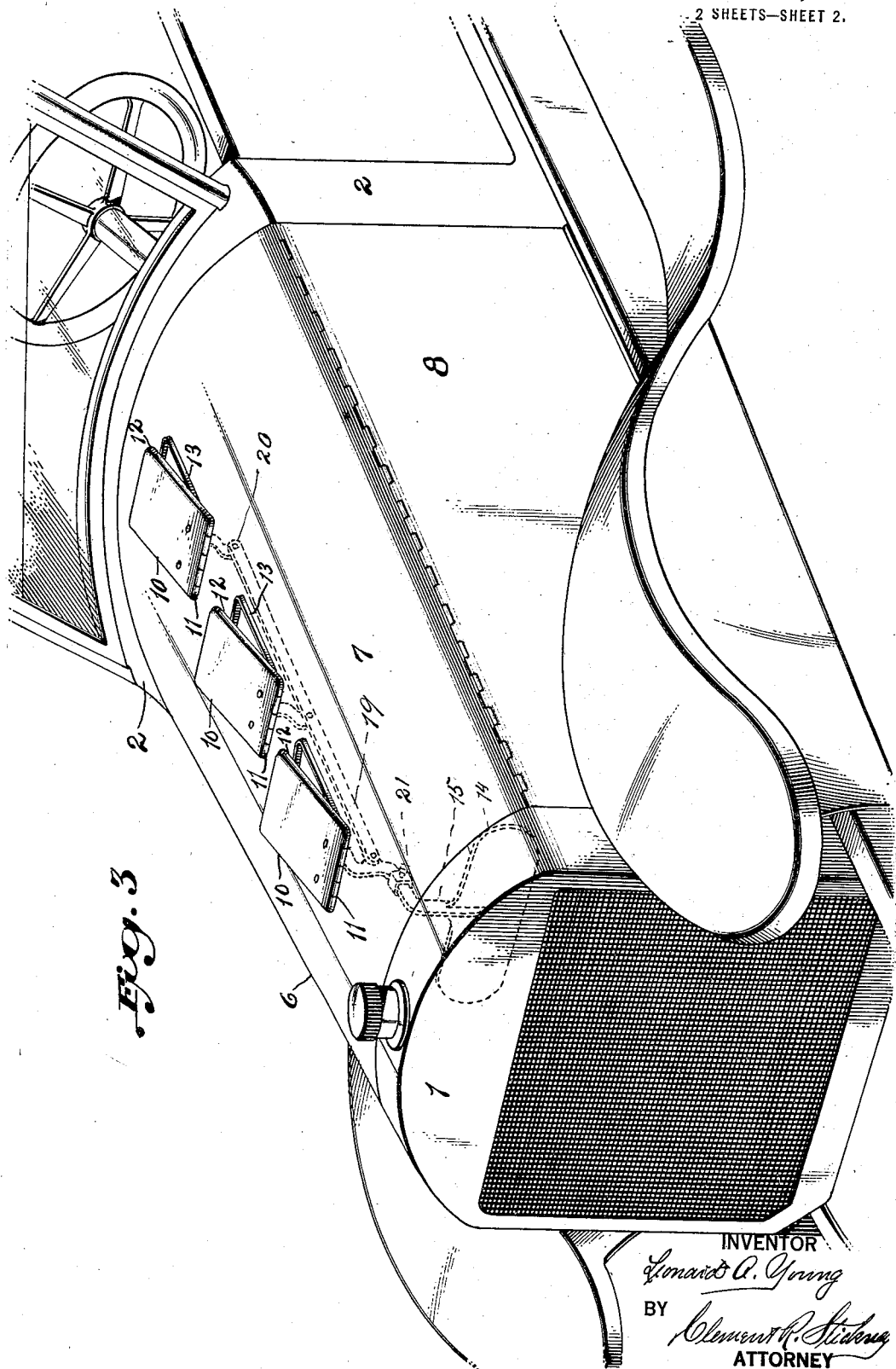

UNITED STATES PATENT OFFICE.

LEONARD A. YOUNG, OF DETROIT, MICHIGAN.

HOOD FOR AUTOMOBILES.

1,411,985.

Specification of Letters Patent.    Patented Apr. 4, 1922.

Application filed April 8, 1920.   Serial No. 372,306.

*To all whom it may concern:*

Be it known that I, LEONARD A. YOUNG, a citizen of the United States of America, residing at Detroit, in the county of Wayne and State of Michigan, have invented certain new and useful Improvements in Hoods for Automobiles, of which the following is a specification.

In the operation of automobiles, it is desirable that there be provision for automatically relieving excessive heat in the upper portion of the engine hood, as the draught from the fan across the engine, while it is turned in the main downwardly and rearwardly from the floor boards, still is pocketed in the upper portion of the hood by the angle formed between the hood and the dash. It is also desirable that the hood be so disposed as to provide for a long stream-line effect regardless of the length or size of the power plant.

This invention relates to hoods for automobiles, and to an arrangement thereof whereby perfect ventilation is provided that is automatically governed by the speed of the engine, while a pleasing contour or outline is obtained in the hood proper.

The invention consists in the matters hereinafter set forth, and more particularly pointed out in the appended claims:

In the drawings:

Figure 1 is a view in side elevation, partially broken away and in section, of an engine hood embodying features of the invention;

Fig. 2 is a view in detail of a hood ventilator and controlling device; and

Fig. 3 is a view in perspective of the forward portion of an automobile equipped with this hood.

In the drawings, a radiator 1 and cowl 2 are disposed in the usual manner on either end of a power plant 3 with the dash 4 and floor board 5 well within the space defined by the radiator and cowl. A hood 6 spans the interval between the cowl and the radiator and is formed of a middle upper section 7 with depending sides 8 hinged thereto so that the hood may be raised from either side on either the adjacent or the opposite hinge as a pivot. When turned back in this manner, it gives free access not only to the power plant proper but to the controlling device such as pedals and the like or the pedal connections which lie beneath the floor board 5 and on both sides of the dash 4.

The fan 9 of the power plant operates in the usual manner to force air drawn through the radiator rearwardly over the power plant and beneath the floor boards 5. This leaves a pocket in the upper portion of the cowl which becomes very hot. To relieve this, ventilators 10 are disposed along the top so as to be tilted upwardly on their forward hinges 11 which are of any suitable type to permit such movement. Preferably the marginal portions 12 of the ventilators are depending flanges that close over corresponding upraised rims 13 around the openings of the middle section 7 on which the ventilators are placed, or other suitable provision is made to protect the plant within the hood from the weather as the car moves forward, or to hermetically seal the hood when the car is stationary and the fan 9 is not revolving.

A controlling vane 14 is hung across the path described by upper currents forced from the fan 9, by means of an arm 15 rigidly secured as at 16 to the forward ventilator. Preferably the arm 15 is so disposed that the blade 14 is on the opposite side of the pivot 11 from the point of attachment of the arm to the ventilator or at any rate the parts are so arranged that the vane 14 in part counterbalances the ventilator 10. Arms 17 and 18 similar to the arm 15 are connected thereto by a link 19 and pivot pins 20 so that movement of the vane 14 rearwardly under the thrust from the fan current, raises the ventilator 10 to a degree dependent upon the strength of the current or speed of the fan.

In order that the vane 14 may be adjusted to be more or less sensitive to the effects of the impinging air current, a counterbalance 21 is adjustably mounted on the horizontal portion of the arm 15 so that the ventilators 10 open to greater or less degree under the fan speed as predetermined by the adjuster.

As a result of this construction an engine hood is obtained which effectively ventilates the space above the engine, so as to increase the flow of air outwardly from the hood in direct ratio to the engine speed. Furthermore, the position of the cowl behind the dash may be so determined as to give an extremely long stream-line effect to the front of the car even though the power plant be of small dimension. In addition to the exterior ornamental effect thus produced, these proportions of the hood give free access to the controlling devices of the automobile which are otherwise accessible only through the floor boards. Thus the operator can at once get to these devices on both sides of the dash as easily as he can to the main power plant by simply raising the hood.

Obviously, changes in the details of construction may be had without departing from the spirit of my invention and I do not care to limit myself to any particular form or arrangement of parts.

What I claim is:

1. In an automobile, a radiator, a power plant behind the radiator, a hood extending rearwardly from the radiator having openings in the upper portion thereof, swinging covers on the opening pivoted at the forward portions to the cowl, depending members from the ventilators coupled to swing together and a vane secured to the members and adapted to swing the ventilators when moved by air currents of the ventilation system of the power plant.

2. In an automobile, a hood having an upper section provided with openings disposed in the upper portion thereof and provided with upper extending flanged margins, covers for the openings with depending margins closing over the opening flanges, hinged to swing upward from the forward portion of each cover, a depending arm rigidly secured to each cover, a link coupling the arms to swing in unison and a vane secured to the forward arm in the path of the upper air currents of the ventilation system of the automobile.

3. In an automobile, a hood having an upper section provided with openings with flanged margins, covers for the openings, with depending margins closing over the flanges of the openings, hinged at the forward portions to swing upward, a depending arm rigidly secured to each cover, a link coupling the arms to swing in unison, a vane secured to the forward arm in the path of the upper air currents of the ventilating system of the automobile and adjustable means for counterbalancing the ventilating covers.

In testimony whereof I affix my signature.

LEONARD A. YOUNG.